US008938804B2

(12) United States Patent
Vaidyanathan et al.

(10) Patent No.: US 8,938,804 B2
(45) Date of Patent: Jan. 20, 2015

(54) SYSTEM AND METHOD FOR CREATING BGP ROUTE-BASED NETWORK TRAFFIC PROFILES TO DETECT SPOOFED TRAFFIC

(75) Inventors: Ravichander Vaidyanathan, Belle Mead, NJ (US); Abhrajit Ghosh, Edison, NJ (US); Akira Yamada, Tokyo (JP); Yukiko Sawaya, Fujimi (JP); Ayumu Kubota, Saitama (JP)

(73) Assignees: Telcordia Technologies, Inc., Piscataway, NJ (US); KDDI Corporation, Tokyo (JP)

( * ) Notice: Subject to any disclaimer, the term of this patent is extended or adjusted under 35 U.S.C. 154(b) by 222 days.

(21) Appl. No.: 13/547,305

(22) Filed: Jul. 12, 2012

(65) Prior Publication Data

US 2014/0020099 A1    Jan. 16, 2014

(51) Int. Cl.
*H04L 29/06*    (2006.01)

(52) U.S. Cl.
CPC ........ *H04L 63/1425* (2013.01); *H04L 63/1483* (2013.01)
USPC ..................... 726/23; 726/12; 726/13; 726/14

(58) Field of Classification Search
CPC .................................................. H04L 63/1425
USPC ........................................ 726/13–14, 22–23
See application file for complete search history.

(56) References Cited

U.S. PATENT DOCUMENTS

| | | | |
|---|---|---|---|
| 6,980,549 B1 * | 12/2005 | Shabtay et al. ............... 370/392 |
| 7,076,803 B2 * | 7/2006 | Bruton et al. .................... 726/23 |
| 7,222,366 B2 * | 5/2007 | Bruton et al. .................... 726/23 |
| 7,490,235 B2 * | 2/2009 | Khosmood et al. ........... 713/154 |
| 7,805,604 B2 * | 9/2010 | Khosmood et al. ........... 713/154 |
| 7,823,202 B1 * | 10/2010 | Nucci et al. ...................... 726/22 |
| 8,015,605 B2 * | 9/2011 | Yegneswaran et al. ......... 726/22 |
| D664,137 S * | 7/2012 | Zheng et al. ................. D14/248 |
| 8,225,377 B2 * | 7/2012 | Maffione et al. ................... 726/4 |
| 8,281,397 B2 | 10/2012 | Vaidyanathan et al. |
| 8,478,831 B2 * | 7/2013 | Davis et al. .................... 709/206 |
| 8,533,822 B2 * | 9/2013 | Byrnes .......................... 726/22 |
| 8,634,428 B2 * | 1/2014 | Le Pennec et al. ........... 370/401 |
| 8,658,794 B2 * | 2/2014 | de Man et al. ................ 544/350 |
| 8,826,413 B2 * | 9/2014 | Vijayakumar et al. .......... 726/13 |
| 2002/0031134 A1 * | 3/2002 | Poletto et al. ................. 370/401 |
| 2002/0166063 A1 * | 11/2002 | Lachman et al. ............. 713/200 |

(Continued)

OTHER PUBLICATIONS

Vaidyanathan, R., Ghosh, A., Yuu-Heng Cheng, Yamada, A. and Miyake, Y., "On the use of BGP AS numbers to detect spoofing" In 2010 IEEE GLOBECOM Workshops (GC Workshops), pp. 1606-1610. Miami, Fla. USA, 2010).*

(Continued)

*Primary Examiner* — David Garcia Cervetti

(57) ABSTRACT

An inventive system and method for creating source profiles to detect spoofed traffic comprises obtaining a routing path for data to traverse nodes using traffic profiles, each routing path comprising at least a target AS, initializing one or more AS sets with last hop ASes, enhancing the AS sets by connecting the AS sets to routers, for each enhanced AS set, filtering observed traffic flows, and using the filtered flows to associate enhanced AS sets with network monitoring points to create the source profiles. In one aspect, filtering flows comprise TCP session filtering and/or destination bogon filtering. In one aspect, the routers are border gateway protocol routers. In one aspect, the last hop ASes are one hop away from the target AS.

12 Claims, 4 Drawing Sheets

(56) References Cited

U.S. PATENT DOCUMENTS

| | | | |
|---|---|---|---|
| 2003/0012147 A1* | 1/2003 | Buckman et al. | 370/260 |
| 2003/0035370 A1* | 2/2003 | Brustoloni | 370/229 |
| 2003/0043853 A1* | 3/2003 | Doyle et al. | 370/489 |
| 2003/0123481 A1* | 7/2003 | Neale et al. | 370/466 |
| 2003/0145225 A1* | 7/2003 | Bruton et al. | 713/201 |
| 2003/0145226 A1* | 7/2003 | Bruton et al. | 713/201 |
| 2003/0145232 A1* | 7/2003 | Poletto et al. | 713/201 |
| 2004/0039840 A1* | 2/2004 | Dispensa et al. | 709/242 |
| 2004/0054925 A1* | 3/2004 | Etheridge et al. | 713/201 |
| 2004/0093521 A1* | 5/2004 | Hamadeh et al. | 713/201 |
| 2004/0125797 A1* | 7/2004 | Raisanen | 370/389 |
| 2005/0108415 A1* | 5/2005 | Turk et al. | 709/232 |
| 2006/0080733 A1* | 4/2006 | Khosmood et al. | 726/13 |
| 2006/0184690 A1* | 8/2006 | Milliken | 709/238 |
| 2007/0016401 A1* | 1/2007 | Ehsani et al. | 704/9 |
| 2007/0064617 A1* | 3/2007 | Reves | 370/252 |
| 2007/0067841 A1* | 3/2007 | Yegneswaran et al. | 726/23 |
| 2007/0097976 A1* | 5/2007 | Wood et al. | 370/392 |
| 2007/0153763 A1* | 7/2007 | Rampolla et al. | 370/351 |
| 2007/0157306 A1* | 7/2007 | Elrod et al. | 726/14 |
| 2007/0162587 A1* | 7/2007 | Lund et al. | 709/223 |
| 2007/0192507 A1* | 8/2007 | DiBiasio et al. | 709/238 |
| 2007/0211722 A1* | 9/2007 | Subramanian | 370/390 |
| 2008/0028467 A1* | 1/2008 | Kommareddy et al. | 726/23 |
| 2008/0052758 A1* | 2/2008 | Byrnes | 726/1 |
| 2008/0244744 A1* | 10/2008 | Thomas et al. | 726/23 |
| 2008/0276304 A1* | 11/2008 | Maffione et al. | 726/4 |
| 2008/0320585 A1* | 12/2008 | Ansari et al. | 726/13 |
| 2009/0025082 A1* | 1/2009 | Ji et al. | 726/23 |
| 2009/0055929 A1* | 2/2009 | Lee et al. | 726/23 |
| 2009/0064332 A1* | 3/2009 | Porras et al. | 726/23 |
| 2009/0125714 A1* | 5/2009 | Khosmood et al. | 713/154 |
| 2009/0245248 A1* | 10/2009 | Arberg et al. | 370/390 |
| 2009/0265785 A1* | 10/2009 | Kwan | 726/23 |
| 2009/0307773 A1* | 12/2009 | Kwan | 726/23 |
| 2010/0067528 A1* | 3/2010 | Napierala | 370/390 |
| 2010/0138919 A1* | 6/2010 | Peng et al. | 726/22 |
| 2010/0263041 A1* | 10/2010 | Shea | 726/14 |
| 2011/0032843 A1* | 2/2011 | Papp et al. | 370/254 |
| 2011/0069714 A1* | 3/2011 | Le Pennec et al. | 370/401 |
| 2011/0138466 A1* | 6/2011 | Ji et al. | 726/23 |
| 2011/0149960 A1* | 6/2011 | Fernandez Gutierrez | 370/390 |
| 2011/0162060 A1* | 6/2011 | Vijayakumar et al. | 726/13 |
| 2011/0214177 A1* | 9/2011 | Spatscheck et al. | 726/22 |
| 2011/0242994 A1* | 10/2011 | Carvalho et al. | 370/252 |
| 2011/0271340 A1* | 11/2011 | Vaidyanathan et al. | 726/22 |
| 2011/0314177 A1* | 12/2011 | Harp | 709/238 |
| 2012/0011584 A1* | 1/2012 | Kwan | 726/13 |
| 2012/0198541 A1* | 8/2012 | Reeves | 726/13 |
| 2012/0272331 A1* | 10/2012 | Lemaster et al. | 726/27 |
| 2013/0094376 A1* | 4/2013 | Reeves | 370/252 |
| 2013/0111189 A1* | 5/2013 | Boehl et al. | 712/29 |
| 2013/0340079 A1* | 12/2013 | Gottlieb et al. | 726/23 |
| 2014/0020099 A1* | 1/2014 | Vaidyanathan et al. | 726/23 |
| 2014/0047500 A1* | 2/2014 | Byrnes | 726/1 |

OTHER PUBLICATIONS

A. Paller, R. Pethia, G. Spaffort, "Consensus Roadmap for Defeating Distributed Denial of Service Attacks", Version 1.10-Feb. 2000. CERT/CC at Carnegie Mellon University, The SANS Institute and the Center for Education & Research in Information Assurance & Security (CERIAS) at Purdue University. Available at http://www.sans.org/dosstep/roadmap.php.

"Worldwide Infrastructure Security Report", Oct. 2008. Arbor Networks. Available at http://www.arbornetworks.com/report.

G. R. Malan, "Observations and Experiences Tracking Denial-Of-Service Attacks Across a Regional ISP", Undated. Arbor Networks/University of Michigan. Available at: http://www.arbornetworks.com/index.php? option=com_docman&task=doc_downloads&gid=97.

A. Ghosh, L. Wong, G. Di Crescenzo, R. Talpade, "InFilter: Predictive Ingress Filtering to Detect Spoofed IP Traffic", Proceedings of the Second International Workshop on Security in Distributed Computing Systems (SDCS) (ICDCSW'05)-vol. 02, 2005.

T. Peng, C. Leckie, R. Kotagiri, "Protection from Distributed Denial of Service Attack Using History-based IP Filtering", IEEE International Conference on Communications (ICC 2003), May 2003, Anchorage, Alaska, USA.

Z. Duan, X. Yuan, J. Chandrashekar, "Constructing Inter-Domain Packet Filters to Control IP Spoofing Based on BGP Updates," Proceedings of INFOCOM 2006. 25th IEEE International Conference on Computer Communications.

* cited by examiner

SYSTEM AND METHOD FOR CREATING BGP ROUTE-BASED NETWORK TRAFFIC PROFILES TO DETECT SPOOFED TRAFFIC

FIELD OF THE INVENTION

This invention relates generally to Internet Routing, Border Gateway Protocol (BGP), Distributed Denial of Service (DDoS) attack detection, spoof detection, intrusion detection and filtering for ISP security.

BACKGROUND OF THE INVENTION

A packet with a spoofed source IP address in its header is a spoofed packet. Spoofed packets are either generated intentionally to support malicious activity or result from misconfigurations. In the former case they are used for anonymity, to reduce the risk of trace-back and to avoid attack detection by network-based sensors. It is fairly trivial for a skillful attacker to use an incorrect source IP address in attack traffic emanating from most widely-used Operating Systems. Since IP routing is destination-based, spoofed IP packets get delivered to the intended target in the same way as non-spoofed IP packets. Spoofed IP packets are particularly prevalent in Distributed Denial of Service (DDoS) attacks, wherein an attacker can compel multiple intermediate compromised hosts to inundate a target host or network with a cumulatively high-volume IP traffic stream. Detection of such DDoS attacks by network based sensors is difficult since spoofing ensures that traffic volumes from individual hosts appear to be low. In addition to high-volume attacks such as DDoS, relatively stealthy attacks may also employ spoofed IP packets. A notable example is the Slammer worm which sends out a single source IP spoofed UDP (User Datagram Protocol) packet that compromises the destination node. Spoofed IP traffic detection is a generic means by which to detect several different types of network attacks without using specialized detectors for each attack.

The construction of a source address profile for a network observation point can be accomplished by making note of source IP addresses on traffic packets observed at this observation point during some time interval. This interval is referred to as a "training period". An issue with this approach is the possible presence of spoofed packets during the training period that could result in the construction of inaccurate source address profiles. An additional issue is the creation of incomplete profiles due to insufficient traffic being observed during the training period.

The problem of spoofed packets being present during the construction of the profile has been addressed by considering only those TCP flows that had a large number of packets. A TCP flow with a large number of packets could be indicative of the TCP handshake completed between the source and the destination, and therefore reduce the possibility of the source being spoofed. This approach is based on the assumption that large TCP flows are indicative of non-spoofed activity. However, this approach can easily be subverted by an attacker who can generate a large number of TCP packets with spoofed IP addresses. It also does not address the problem of incomplete profiles being created due to low volumes of observed traffic.

Moreover, the problem of incomplete profiles has been addressed by creating the profiles in terms of BGP Autonomous System (AS) numbers rather than source IP addresses. Since multiple IP prefixes can map to a single AS number, this allows the creation of profiles with AS numbers for unobserved IP prefixes. This approach does not address the problem of spoofed source IP addresses being observed while generating BGP AS number based profiles. Instead the approach is more focused on addressing the problem of generating profiles even when low volumes of traffic are observed while creating the profiles.

An approach to constructing Inter-Domain Packet Filters (IDPFs) that relies on edge routers constructing a set of feasible upstream neighbors for a given destination has also been tried. The set of feasible upstream neighbors is constructed based on local routing updates as received from immediate neighbors. For a given destination, the set of feasible upstream neighbors can include neighbors in addition to those actually used for sending traffic to the destination from the source in question. This approach uses local routing information only and needs to be deployed on edge routers.

SUMMARY OF THE INVENTION

A novel method for constructing source profiles that cannot be subverted by spoofed traffic and can be deployed at arbitrary network monitoring points is presented. In contrast to known techniques, the inventive approach uses paths inferred from publicly available routing data repositories that match the best paths used between a source and destination, and reduces the possibility of false negatives relative to the IDPF approach, since the latter uses feasible paths rather than best paths. Further, the novel technique can be used at arbitrary network monitoring points within the core of the network.

A system for creating source profiles to detect spoofed traffic comprises

An inventive method for creating source profiles to detect spoofed traffic comprises steps of obtaining a routing path for data to traverse nodes using traffic profiles, each routing path comprising at least a target AS; initializing one or more AS sets with last hop ASes; enhancing the AS sets by connecting the AS sets to routers; for each enhanced AS set, filtering observed traffic flows; and using the filtered flows to associate enhanced AS sets with network monitoring points to create the source profiles.

In one aspect, filtering flows comprise TCP session filtering and/or destination bogon filtering. In one aspect, the routers are border gateway protocol routers. In one aspect, the last hop ASes are one hop away from the target AS.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 2 is an exemplary illustration of last hop ASes associated with a monitoring point in a target AS.

DETAILED DESCRIPTION

An inventive solution to the problem of creating source address profiles for traffic observation points in a network is presented. Such source address profiles can be used to detect "Spoofed" IP packets as they traverse an observation point by comparing the source addresses on these packets with the profiles associated with the observation point. An example of an observation point would be a router within a network.

Figure 1:
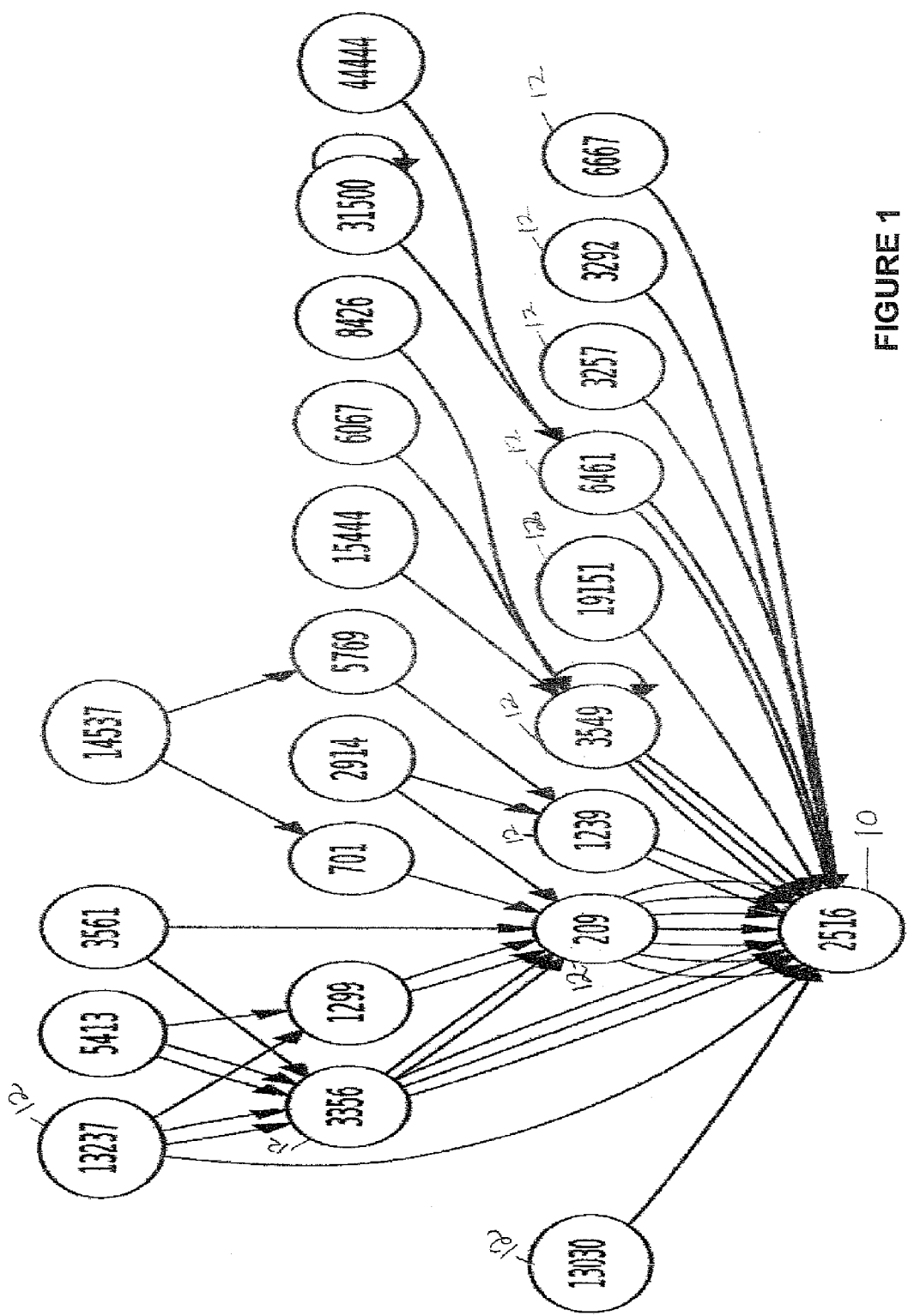
FIG. 1 is an exemplary AS path graph.

FIG. 1 depicts an example AS path graph, e.g., a graph of paths and nodes in a network. The arrows indicate the direction of data packets from each AS to the target AS 10. AS 2516 is the target AS 10 in the example. An AS path graph of this type can be constructed based on AS path information that is available at public BGP routing information repositories (e.g., Routeviews). An AS path read from left to right indicates a sequence of BGP Autonomous Systems (ASes) that must be traversed by packets originating at the first AS and destined for the last AS. An AS path is a sequence of AS numbers, for example: 13237 1299 209 2516. In the inventive approach disclosed herein, any AS that is a single hop away from the target AS is considered to be a last hop AS 12 for the target AS 10. Based on the graph, the following AS numbers are the last hop ASes 12 for target AS 10 (AS 2516), e.g., 13030, 13237, 3356, 209, 1239, 3549, 19151, 6461, 3257, 3292, 6667.

Figure 2:
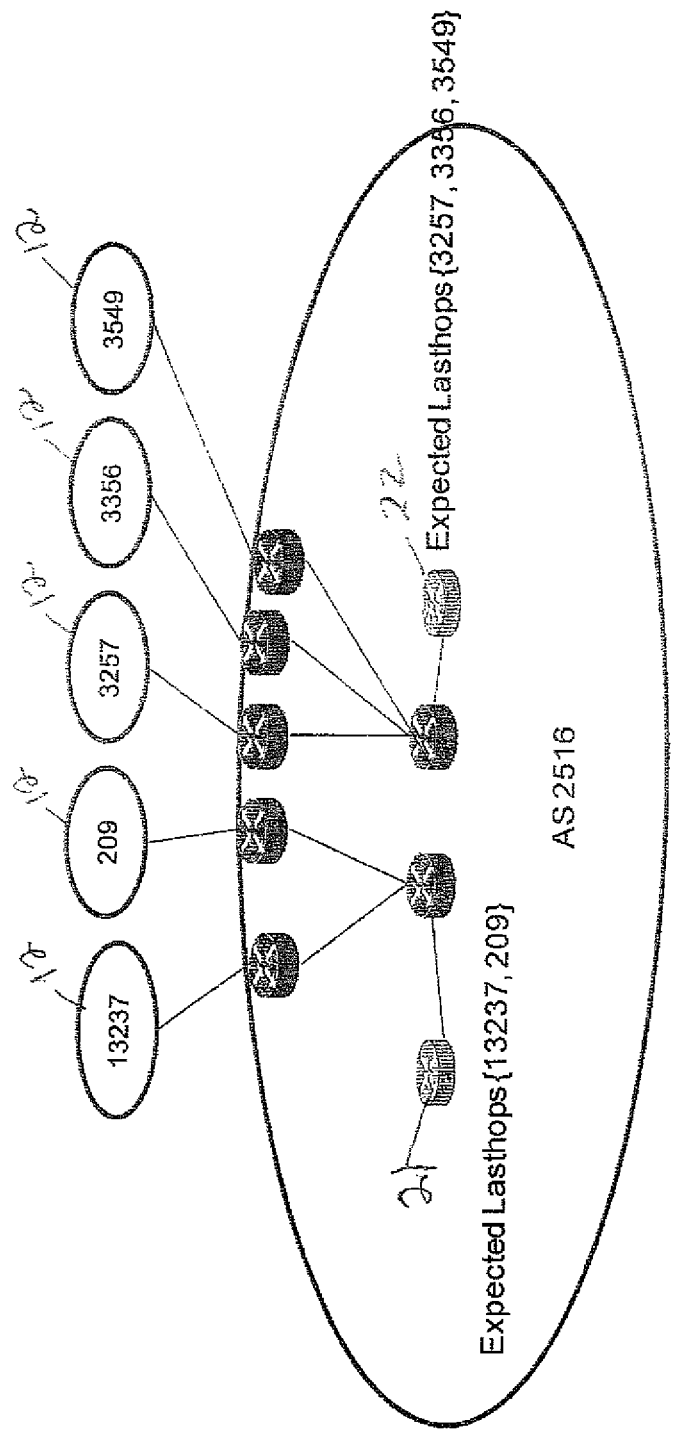

FIG. 2 illustrates, by example, how last hop ASes can be associated with a monitoring point in a target AS. AS 2516 contains two monitoring points 21, 22. The monitoring point 21 on the left is able to observe traffic traversing ASes 13237 and 209 while the one on the right 22 is able to observe traffic traversing ASes 3257, 3356 and 3549. Thus individual last hop ASes can be associated with each monitoring point to construct source profiles for the monitoring point.

Based on the AS path graph shown in FIG. 1, it is possible to infer that traffic from ASes 15444, 6067 and 8426 will transit the last hop AS 3549 prior to entering target AS 2516. Thus, it is possible to associate these three ASes with the same monitoring point that is associated with AS 3549 and thereby enhance the source profile associated with it.

Figure 3:
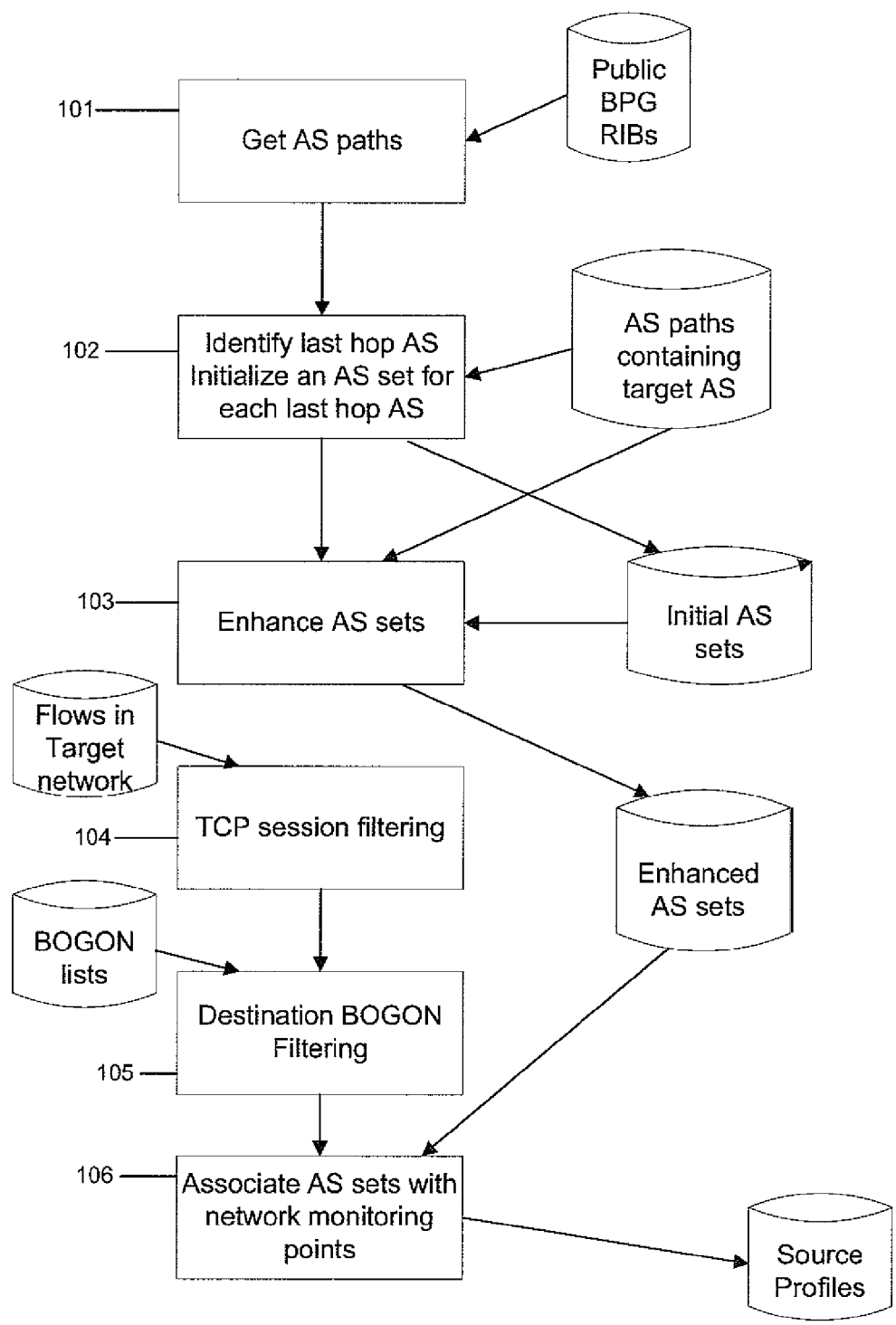
FIG. 3 is a flow diagram of the inventive method.

FIG. 3 illustrates the operation of the inventive process. In this novel process, source profiles for monitoring points within a target network are computed.

In the initial step S101, AS paths containing the target AS 10 are retrieved from public repositories of BGP routing information, e.g., RIBs.

Each AS path is of the form: $AS_1\ AS_2\ \ldots\ AS_{t-2}\ AS_{t-1}\ AS_t\ \ldots\ AS_n$ where $AS_t$ denotes the target AS.

In the next step S102, any $AS_{t-1}$ preceding the target $AS_t$ is identified as a last hop AS for $AS_t$. An AS set is initialized for each last hop AS.

In the next step S103, any $AS_i$ (i=1 ... t−2) preceding the last hop $AS_{t-1}$ is added to the AS set associated with $AS_{t-1}$.

Next, network flows observed at each network monitoring point are used to associate AS sets with the monitoring point. A network flow consists of several data items and in particular contains the source AS number corresponding to the network that originated the flow. To reduce the possibility of spoofed flows impacting the profile generation process, only flows that correspond to established TCP flows are considered. Also, flows to destinations for which flows with Bogon source addresses have recently been observed are ignored to further reduce the possibility of considering flows that correspond to random spoofing attacks. The following processing steps are carried out for each observed network flow.

In step S104, determine if the flow corresponds to an established TCP flow. Any TCP flow without the SYN, RST and FIN flags set can be considered to be an established flow. All other flows are ignored.

In step S105, determine if bogon sources were recently observed for the destination of the current flow. Any destination address for which bogon sources were observed is cached for a pre-determined amount of time, all flows (even with non-bogon sources) to such destinations are ignored for this duration. Publicly available bogon lists are used to identify bogon sources.

In step S106, extract the source AS number for the flow (if it was not filtered out by steps 104 and 105). Identify one or more AS sets (as created by step 103) that contain this source AS. Add each AS set to the source profile for this monitoring point.

In the inventive technique, TCP flags are used to determine whether flows are established. This is useful in a sampling based monitoring environment where information on a single large flow can be distributed across several small flow records. In addition, the inventive technique considers AS numbers while creating source profiles, which is different from the IP address based profiles considered in prior art. AS number based profiles address the problem of low volumes of traffic observed while building the profiles which, in the case of some prior approaches, can lead to limited source coverage for the profile. In prior art approaches, only high volume TCP flows corresponding to established TCP sessions are considered.

Moreover, the inventive approach uses BGP routing information to create profiles that include AS numbers which may not have been observed during the profiling period. The novel technique uses paths inferred from publicly available routing data repositories that match the best paths used between a source and destination, and reduces the possibility of false negatives particularly relative to the IDPF approach, since the latter uses feasible paths rather than best paths. Further, the inventive approach can be used on network monitoring points within the core of the network.

This inventive technique uses Internet Routing Topology represented by Autonomous System Paths (AS Paths) to determine whether traffic is expected to arrive at a given observation point in the Internet. In addition, this inventive method can use a global view of the Internet Routing Topology to determine source address profiles and can handle asymmetric routing topologies. Other solutions that mitigate spoofing or attempt to detect spoofed packets typically leverage only historical trace information or may use known signatures of malicious traffic. Further, other methods, such as IDPF, use the router's local routing information database to figure out feasible paths to a destination. Such techniques do not work well in the presence of asymmetric routing.

Figure 4:
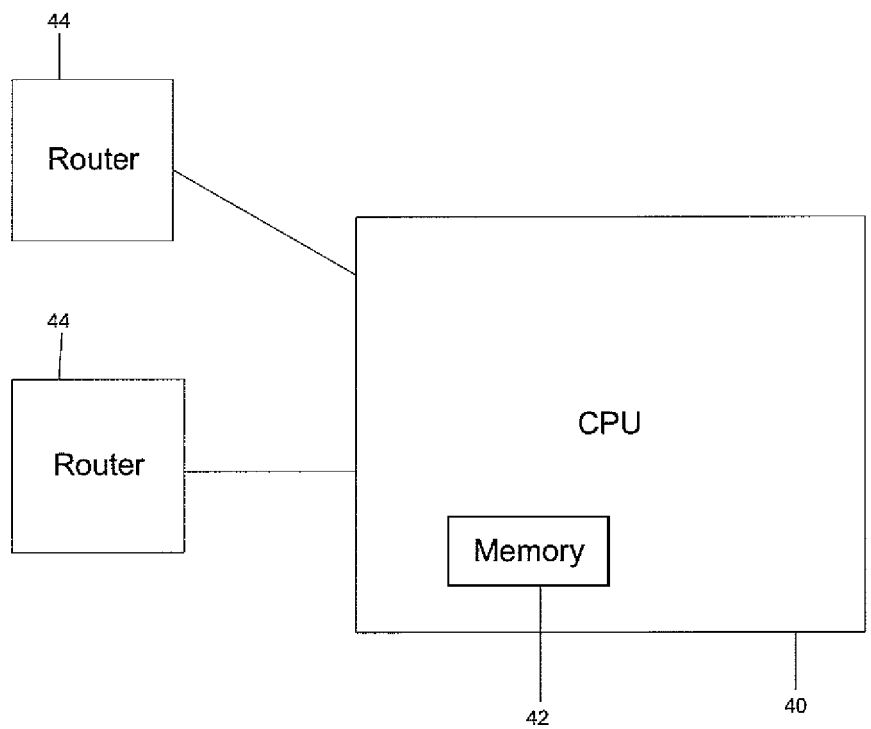
FIG. 4 is schematic diagram of the inventive system.

FIG. 4 shows a schematic diagram of an embodiment of the inventive system. In this embodiment, the system comprises a CPU 40 and memory 42 along with routers 44 on the internet. Two routers 44 are shown, but any number can be used in the system. In this inventive system, the CPU 40 can execute modules that perform the steps described in FIG. 3 above.

An initial evaluation of the effectiveness of using BGP route based traffic profiles was conducted using flow data collected over a one hour interval in a Tier 1 ISP network. The goal was to examine the consistency of observation of elements of an AS set at each of a set of monitoring points.

Data was collected from several monitoring points in the network and consisted of slightly under 55 million flows. The source AS number for each flow along with the identifier of the monitoring point where it was observed was extracted from the data.

The following definitions were used as part of the analysis:
LHA={A|A is a last hop AS for the target AS}
LHAS(A)={a|a is an AS in the AS set for AS A, a≠A, A∈LHA}
F(x)={f|f is a monitoring point where AS x was observed as a source AS}
A(f)={x|x ∉LHA is AS that was observed as a source AS at monitoring point f}

Metrics were computed as follows:

∀A∈LHA
∀B∈LHA such that B≠A
    ∀f∈F(A)\F(B) (i.e. A was observed at f, B was not observed at f)

$$\varphi(f, A) = \frac{A(f) \cap LHAS(A)}{LHAS(A)}$$

$$\psi(f, B) = \frac{A(f) \cap LHAS(B)}{LHAS(B)}$$

The φ metric is the fraction of AS numbers in LHAS(A) that were observed at a monitoring point where A was observed. The ψ metric provides the fraction of AS numbers in LHAS(B) that were observed at a monitoring point where B was not observed. We expect φ to have generally higher values than ψ since we expect larger portions of LHAS(A) to be visible at a monitoring point where A was observed, relative to portions of LHAS(B) at a monitoring point where B was not observed.

| Value | φ Count | ψ Count |
| --- | --- | --- |
| [0.0, 0.1) | 443 | 731 |
| [0.1, 0.2) | 62 | 41 |
| [0.2, 0.3) | 95 | 7 |
| [0.3, 0.4) | 52 | 0 |
| [0.4, 0.5) | 77 | 5 |
| [0.5, 0.6) | 126 | 11 |
| [0.6, 0.7) | 21 | 0 |
| [0.7, 0.8) | 7 | 0 |
| [0.8, 0.9) | 0 | 0 |
| [0.9, 1.0] | 127 | 76 |

The table above lists the counts for the collected data for different values of φ and ψ. In each case a significant number of values is listed. Since these metrics are not defined for all last hop ASes, the total number of the values for each metric differs. We observe that the bulk of the values for ψ are less than 0.1 while a significant portion of the values for φ are more than 0.4.

If we consider the cumulative distribution functions for these metrics, we observe that only 10% of the observed values for ψ exceed 0.2 while 50% of the observed values for φ do the same. In fact, close to 30% of the values for φ exceed 0.4 indicating that 40% or more of the elements in the AS sets for these last hop ASes were observed where the corresponding last hop ASes were observed.

The inventive system and method advantageously allows the creation of source profiles while minimizing the possibility of source address spoofing impacting the profile creation process and also considers global internet routing information to build profiles thus allowing the incorporation of AS numbers that were not observed in the network flows used to construct the profile.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method in a system for creating source profiles to detect spoofed traffic, the method comprising:
    obtaining, by the system, a routing path for data to traverse nodes using traffic profiles, each routing path comprising at least a target Autonomous System (AS);
    initializing, by the system, one or more AS sets with last hop ASes;
    enhancing, by the system, the AS set(s) by connecting the AS set(s) to routers;
    for each enhanced AS set, filtering by the system observed traffic flows, wherein the filtering observed traffic flows comprises established Transmission Control Protocol (TCP) filtering where any TCP traffic flow without SYN, RST and FIN flags set are considered when creating the source profiles and all other traffic flows are ignored; and, using, by the system, the filtered flows to associate enhanced AS set(s) with network monitoring points to create the source profiles.

2. The method according to claim 1, wherein the filtering observed traffic flows further comprises destination bogon filtering where the observed traffic flows to destinations for which flows with bogon source addresses have been observed within a predetermined amount of time are ignored when creating the source profiles.

3. The method according to claim 1, wherein the routers are border gateway protocol routers.

4. The method according to claim 1, wherein the last hop ASes are one hop away from the target AS.

5. A system for creating source profiles to detect spoofed traffic comprises:
    a processor; and,
    a memory that stores processor-executable instructions where the processor interfaces with the memory and executes the processor-executable instructions to enable following operations:
        obtain a routing path obtained for data to traverse nodes using traffic profiles, each routing path comprising at least a target Autonomous System (AS),
        initialize one or more AS sets with last hop ASes,
        enhance the AS set(s) by connecting the AS set(s) to routers,
        for each enhanced AS set, filter observed traffic flows, wherein the filtering observed traffic flows comprises established Transmission Control Protocol (TCP) filtering where any TCP traffic flow without SYN, RST and FIN flags set are considered when creating the source profiles and all other traffic flows are ignored, and,
        use the filtered flows to associate enhanced AS set(s) with network monitoring points to create the source profiles.

6. The system according to claim 5, wherein the filter of observed traffic flows further comprises destination bogon filtering where the observed traffic flows to destinations for which flows with bogon source addresses have been observed within a predetermined amount of time are ignored when creating the source profiles.

7. The system according to claim 5, wherein the routers are border gateway protocol routers.

8. The system according to claim 5, wherein the last hop ASes are one hop away from the target AS.

9. A system for creating source profiles to detect spoofed traffic comprises:
    a processor; and,
    a memory that stores processor-executable instructions where the processor interfaces with the memory and executes the processor-executable instructions to enable following operations:
        obtaining Autonomous System (AS) paths, each AS path is of form $AS_1\ AS_2\ldots AS_{t-2}\ AS_{t-1}\ AS_t\ldots AS_n$ where $AS_t$ denotes a target AS;
        identifying any $AS_{t-1}$ preceding the target $AS_t$ as a last hop AS for target $AS_t$;
        initializing an AS set for each last hop $AS_{t-1}$;
        adding any ASi (i=1 ... t−2) preceding the last hop $ASt_{-1}$ to the AS set associated with that last hop $ASt_{-1}$;
        filtering observed traffic flows, wherein the filtering comprises established Transmission Control Protocol (TCP) filtering where any TCP traffic flow without SYN, RST and FIN flags set are considered when creating the source profiles and all other traffic flows are ignored, and,
        extracting a source AS number for the traffic flow that was not filtered out to identify one or more AS sets that contain the source AS number and then associate the identified one or more AS sets with networking points to create the source profiles.

10. The system according to claim 9, wherein the filtering of the observed traffic flows further comprises destination bogon filtering where the observed traffic flows to destinations for which flows with bogon source addresses have been observed within a predetermined amount of time are ignored when creating the source profiles.

11. The system according to claim 9, wherein the ASes are routers.

12. The system according to claim 9, wherein the last hop ASes are one hop away from the target AS.

* * * * *

UNITED STATES PATENT AND TRADEMARK OFFICE
CERTIFICATE OF CORRECTION

PATENT NO. : 8,938,804 B2
APPLICATION NO. : 13/547305
DATED : January 20, 2015
INVENTOR(S) : Vaidyanathan et al.

It is certified that error appears in the above-identified patent and that said Letters Patent is hereby corrected as shown below:

In the Specification

In Column 5, Line 1, delete "is AS" and insert -- is an AS --, therefor.

Signed and Sealed this
Twenty-eighth Day of July, 2015

Michelle K. Lee
*Director of the United States Patent and Trademark Office*